US011792311B2

(12) United States Patent
Griffith

(10) Patent No.: US 11,792,311 B2
(45) Date of Patent: Oct. 17, 2023

(54) PORTABLE TERMINAL ACCESSORY DEVICE FOR HOLOGRAPHIC PROJECTION AND USER INTERFACE

(71) Applicant: IKIN, INC., San Diego, CA (US)

(72) Inventor: Taylor Scott Griffith, San Diego, CA (US)

(73) Assignee: IKIN, Inc., San Diego, CA (US)

( * ) Notice: Subject to any disclaimer, the term of this patent is extended or adjusted under 35 U.S.C. 154(b) by 33 days.

(21) Appl. No.: 17/525,747

(22) Filed: Nov. 12, 2021

(65) Prior Publication Data

US 2022/0078271 A1 Mar. 10, 2022

Related U.S. Application Data

(63) Continuation of application No. 16/816,154, filed on Mar. 11, 2020, now Pat. No. 11,258,890, which is a (Continued)

(51) Int. Cl.
*G03H 1/00* (2006.01)
*H04M 1/02* (2006.01)
*G03H 1/02* (2006.01)

(52) U.S. Cl.
CPC ........ *H04M 1/0272* (2013.01); *G03H 1/0005* (2013.01); *G03H 1/02* (2013.01); *G03H 2001/0232* (2013.01)

(58) Field of Classification Search
CPC .... H04N 1/0272; G03B 21/00; G03B 21/145; G03B 21/26; G03B 21/30; G03B 21/56;
(Continued)

(56) References Cited

U.S. PATENT DOCUMENTS

D318,478 S 7/1991 Lo
D329,448 S 9/1992 Lo
(Continued)

FOREIGN PATENT DOCUMENTS

EP 1678529 A1 7/2006
EP 3451661 A1 3/2019
(Continued)

OTHER PUBLICATIONS

Cauchard, et al. Steerable projection: exploring alignment in interactive mobile displays, Personal and Ubiquitous Computing, Jan. 2012, pp. 27-37.
(Continued)

*Primary Examiner* — Arnel C Lavarias
(74) *Attorney, Agent, or Firm* — Cooley LLP

(57) ABSTRACT

A holographic display system for a portable electronic device. The display system includes a case configured to receive the portable electronic device and a projector coupled to the case by a first hinge element. The projector includes a projector screen for generating images. A reflective element is coupled to the projector by a second hinge element. The reflective element is oriented to reflect light from the images in order to create holographic images perceptible to a user of the portable electronic device. The case may include a connector for receiving, from the portable electronic device, a video signal defining the images. The holographic display system may further include a substantially transparent touch screen attached to the first hinge element.

8 Claims, 13 Drawing Sheets

Related U.S. Application Data continuation-in-part of application No. 29/658,352, filed on Jul. 30, 2018, now abandoned.

(60) Provisional application No. 62/816,811, filed on Mar. 11, 2019.

(58) Field of Classification Search
CPC ...... G03B 21/58; G03B 21/606; G03B 21/62; G03H 1/0005; G03H 1/02; G03H 2001/0232; G03H 1/00; G03H 2001/0216; G02B 30/00; G02B 30/40; G02B 30/60
USPC ............ 455/556.1, 556.2; 359/1, 13, 32, 35; 430/1, 2; 353/10, 22, 28, 39, 71, 81, 84, 353/85, 97, 119
See application file for complete search history.

(56) References Cited

U.S. PATENT DOCUMENTS

| | | | |
|---|---|---|---|
| 5,677,701 | A | 10/1997 | Okuyama |
| 6,481,851 | B1 | 11/2002 | McNelley et al. |
| 6,637,896 | B2 | 10/2003 | Li |
| 6,710,797 | B1 | 3/2004 | McNelley et al. |
| D671,939 | S | 12/2012 | Chung |
| D685,779 | S | 7/2013 | Schriefer |
| D687,877 | S | 8/2013 | Chang |
| D698,773 | S | 2/2014 | Wildner |
| 8,820,936 | B2 | 9/2014 | Chen |
| D735,709 | S | 8/2015 | Daniel |
| D741,854 | S | 10/2015 | Daniel |
| D761,790 | S | 7/2016 | Yamazaki |
| D763,839 | S | 8/2016 | Shin |
| 9,723,246 | B2 | 8/2017 | Thomas |
| D812,605 | S | 3/2018 | Sanda |
| D816,627 | S | 5/2018 | Kim |
| D836,077 | S | 12/2018 | Cho |
| D841,719 | S | 2/2019 | Meneses |
| 11,258,890 | B2 * | 2/2022 | Griffith ................. G03B 21/28 |
| 2002/0058531 | A1 | 5/2002 | Terasaki |
| 2003/0114200 | A1 | 6/2003 | Lee |
| 2006/0145947 | A1 | 7/2006 | Arneson |
| 2008/0068565 | A1 | 3/2008 | Ko |
| 2008/0212271 | A1 | 9/2008 | Misawa |
| 2009/0128785 | A1 | 5/2009 | Silverstein |
| 2010/0045569 | A1 | 2/2010 | Silverstein |
| 2011/0037952 | A1 | 2/2011 | LaDuke |
| 2012/0287503 | A1 | 11/2012 | Mase |
| 2013/0187950 | A1 | 7/2013 | Nowatzyk |
| 2014/0253991 | A1 | 9/2014 | Vilardell et al. |
| 2016/0041522 | A1 | 2/2016 | Brasil |
| 2016/0165208 | A1 | 6/2016 | Liu et al. |
| 2017/0205854 | A1 | 7/2017 | Zenoff |
| 2017/0236491 | A1 * | 8/2017 | Foster ..................... G06F 3/048 345/173 |
| 2017/0322513 | A1 | 11/2017 | Zapanta |
| 2020/0213433 | A1 | 7/2020 | Griffith |
| 2022/0196894 | A1 | 6/2022 | Griffith |

FOREIGN PATENT DOCUMENTS

| | | |
|---|---|---|
| ES | 2406205 A2 | 6/2013 |
| FR | 3022040 A1 * | 12/2015 |
| GB | 2508404 A | 6/2014 |
| KR | 20150120712 A | 10/2015 |
| WO | WO-2011045437 A1 | 4/2011 |
| WO | WO-2014073093 A1 | 5/2014 |
| WO | WO-2018012541 A1 | 1/2018 |

OTHER PUBLICATIONS

Holographic Presentation of 3D Data Becoming a Reality—IKIN at CES 2021, publication date Jan. 15, 2021, 2 pages.

Samsung Galaxy S11 with docking station for aerial projection, publication date Sep. 30, 2019, 10 pages, [online][site visited Apr. 12, 2021] URL: https://nl.letsgodigital.org/smartphones/samsung-smartphone-docking-station-3d-hologram/.

United States Patent and Trademark Office, International Search Report and Written Opinion, dated Jul. 16, 2020 for International Application No. PCT/US2020/022186, 11 pages.

Extended European Search Report for European Application No. 20770258.0 dated Nov. 9, 2022, 9 pages.

International Search Report and Written Opinion for Application No. PCT/US2022/034418, dated Oct. 12, 2022, 14 pages.

International Search Report and Written Opinion for International Application No. PCT/US2021/065095, dated Apr. 13, 2022, 14 pages.

Invitation to Pay Fee for International Application No. PCT/US2022/034416 dated Nov. 14, 2022, 12 pages.

* cited by examiner

An External HUB with an OLED display driver recieves video input from individual application that have the h.A.P.I software embedded which inverts the video signal, increases the saturation and black-point and sends it to the OLED for projection.

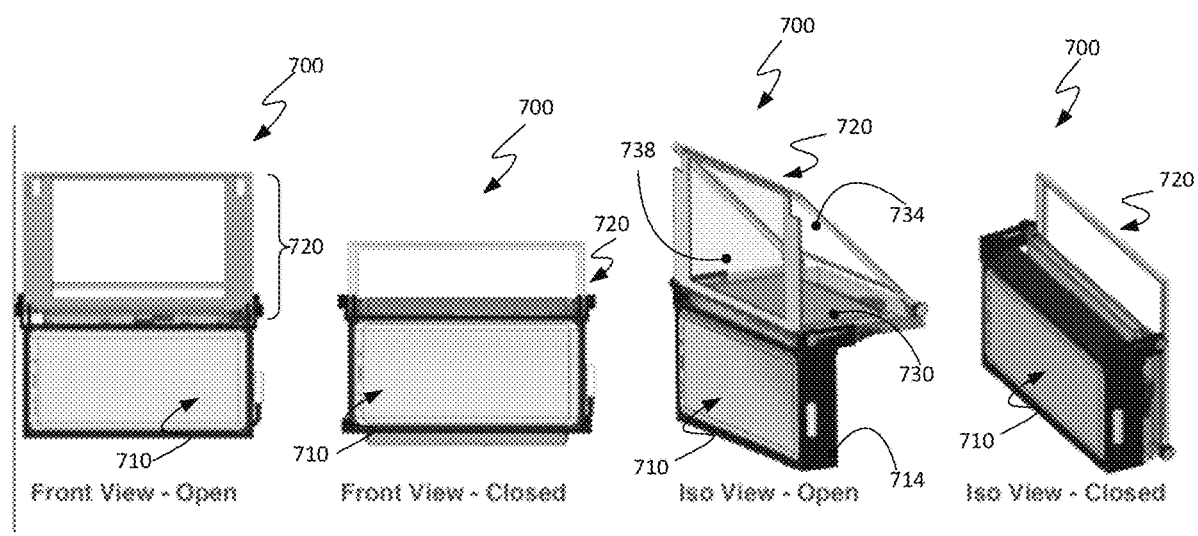

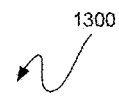

| |
|---|
| PROVIDING A HOLOGRAPHIC DISPLAY SYSTEM INCLUDING A HOLOGRAPHIC DISPLAY ASSEMBLY HAVING A PROJECTOR SCREEN COUPLED TO A CASE BY A FIRST HINGE ELEMENT, A REFLECTIVE ELEMENT COUPLED TO THE PROJECTOR BY A SECOND HINGE ELEMENT, AND A TRANSPARENT TOUCH SCREEN HINGED TO THE CASE  1302 |
| ROTATING A FIRST HINGE ELEMENT COUPLING A PROJECTOR SCREEN OF A HOLOGRAPHIC DISPLAY ASSEMBLY TO A CASE OF THE ASSEMBLY TO POSITION THE PROJECTOR SCREEN AT A FIRST PREDEFINED ANGLE RELATIVE TO THE CASE  1304 |
| ROTATING A SECOND HINGE ELEMENT OF THE ASSEMBLY TO SET A REFLECTIVE ELEMENT AT A SECOND PREDEFINED ANGLE RELATIVE TO THE PROJECTOR SCREEN  1308 |
| ROTATING A TRANSPARENT TOUCH SCREEN HINGED TO THE CASE TO A THIRD PREDEFINED ANGLE RELATIVE TO THE PROJECTOR SCREEN  1312 |
| SLIDING A FLOATING HINGE AND AN EXTENSION PIECE OF THE SECOND HINGE ELEMENT INTO A A SLIDING COVER DISPOSED UNDER A BOTTOM OF THE PROJECTOR SCREEN  1316 |

FIG. 13

PORTABLE TERMINAL ACCESSORY DEVICE FOR HOLOGRAPHIC PROJECTION AND USER INTERFACE

CROSS-REFERENCE TO RELATED APPLICATIONS

The present application is a continuation of application Ser. No. 16/816,154, entitled PORTABLE TERMINAL ACCESSORY DEVICE FOR HOLOGRAPHIC PROJECTION AND USER INTERFACE, filed on Mar. 11, 2020, which claims priority under 35 U.S.C. § 119(e) to U.S. Provisional Patent Application Ser. No. 62/816,811, entitled PORTABLE TERMINAL ACCESSORY DEVICE FOR HOLOGRAPHIC PROJECTION AND USER INTERFACE, filed on Mar. 11, 2019, and is a continuation-in-part of U.S. Design application No. 29/658,352, entitled CELL PHONE CASE WITH COLLAPSIBLE HOLOGRAPHIC DISPLAY SYSTEM, filed Jul. 30, 2018, the contents of each of which are hereby incorporated by reference in their entirety for all purposes.

FIELD

The invention relates to display systems for portable electronic devices and, more particularly, to auxiliary display systems for use with such devices.

BACKGROUND

Mobile phones, tablets, laptop/desktop computers and other electronic devices have become mainstay consumer devices. In recent years the addition of Augmented Reality (AR) software development and implementation have allowed developers to create immersive and interactive environments. However, both general electronics usage as well as AR software, are dependent on 2D screen technology and camera control to create these environments, thus creating difficulty for developers and frustration for consumers.

Virtual Reality (VR) and AR goggle or headset systems have also been created in an attempt to further improve the electronic experience. However, many issues arise for developers of VR and AR systems such as, for example, difficulty of programming, heavy CPU usage, difficulty of manufacture, and the like. The use of AR and VR systems may also have negative consequences for consumers. For example, some users of VR and AR equipment experience eye strain, headaches, migraines, nausea, and may be simply generally uncomfortable when using such equipment.

With the increase in AR software sophistication and the mass user desire to enjoy augmented environments, a functional improvement of AR projection and experience is necessary to further improve the growth of enhanced reality systems.

SUMMARY

Disclosed herein is a collapsible holographic interaction display accessory device for use with a computing and/or communication device. The disclosed portable, collapsible, terminal display device may accept data input from, for example, a portable electronic device such as a cellular phone, digital phone, PC, or tablet computer and project the received input into a holographic display field. When combined with Augmented Reality (AR) software, a holographic AR projection is created. This allows a user to perceive a holographic environment or object placed in the environment surrounding the user's portable computing device. The interactive display accessory device is configured with the capability to accept user input, such as through a touch screen disposed within or proximate the holographic display field. This allows for a multiplicity of high-level programming and user input functions to be received by the interactive display accessory and provided to an attached computing device (e.g., a user's digital phone). The device includes a holographic viewing field, utilizing a reflective transparent surface, the screen of the accessory can be positioned above the viewing space of the electronic device to create the holographic effect. The holographic display system implemented by the accessory may include a protective casing screen, foil or transparent reflective surface such as a beam splitter, touch screen, and a projector. The projector may be comprised of a Liquid Crystal Display (LCD) screen, Organic Light-Emitting Diode (OLED) screen, image projector or other type of image projection device. The interactive display accessory device is preferably designed with collapsible hinges, thereby permitting the holographic view-field to be compressed into a convenient, user-friendly size, and subsequently reopened.

Implementations of the accessory device are adaptable, with minor dimensional changes, and capable of being applied to a litany of devices: mobile phones, tablets, personal computers (PC), any computation device capable of sending an external video signal. Video signal can be sent via the standard electronic signal input port per device, Universal Serial Bus (USB), USB-C, Lightning connector, HDMI, and translated by the accessory into a holographic display.

The accessory device can be used to provide a comfortable viewing field for any current mobile phone, tablet, or PC function such as gaming, messaging, video conferencing, software development, viewing and developing web pages, social media interaction. The accessory includes a "floating" touch screen, held in place by a single base hinge, which provides users with touch control, which when sent back to the operating system of the attached device, allows for control of the holographically projected environment.

In certain embodiments, the accessory device includes an internal battery to power both the projection accessory and the electronic device to which the accessory device is connected. When the holographic display hinges are opened to their full viewing angles they also serve as an ideal position stand for mobile phones to improve both the normal screen viewing and holographic viewing experience when utilizing phone functions.

In one implementation a holographic display assembly of the accessory includes a holographic projection foil backed by a protective polymer sheet with a curvature at an upper axis point. In certain embodiments a high-index reflective coating can be added to the protective polymer to create a second holographic projection behind the initial holographic foil, thus adding more depth to the projected imagery. In another embodiment an antireflective layer can be added to remove all projected light and revert the system back to a single image projection. The angled foil and backing protective polymer are connected, via a second hinge, to the image projector, subsequently, the projector is connected on its opposite side to the casing unit itself.

When utilizing an LCD, OLED, or other display type projector, a horizontal polarizing glass may be placed above the screen to prevent the user from viewing the projection from its initial source, thus improving the overall experience of the hologram projection.

In certain embodiments the holographic projection is displayed using one or more magnification lenses or on multiple reflection screens at varying angles to display the projected light. Thus, creating a larger view field and changing or manipulating the projected images to create different viewing systems.

When the collapsed holographic space is opened from its collapsed position, the second hinge connecting the OLED or LCD projector panel to the holographic foil and protective casing the phone can be places in a horizontal setting for viewing, or vertical as a kick-stand function to improve viewing.

In one aspect the disclosure relates to a holographic display system for a portable electronic device. The display system includes a case configured to receive the portable electronic device and a projector coupled to the case by a first hinge element. The projector includes a projector screen for generating images. A reflective element is coupled to the projector by a second hinge element. The reflective element is oriented to reflect light from the images in order to create holographic images perceptible to a user of the portable electronic device. The case may include a connector for receiving, from the portable electronic device, a video signal defining the images.

The holographic display system may further include a substantially transparent touch screen attached to the first hinge element. The substantially transparent touch screen may be movable between an extended state in optical alignment with the holographic images and a collapsed state substantially parallel to a surface of the projector screen. The projector screen may be movable between an extended state substantially perpendicular to a display screen of the portable electronic device and a collapsed state substantially parallel to a rear surface of the portable electronic device. The reflective element may be movable between an extended state at an acute angle to the projector screen and a collapsed state substantially parallel to the projector screen. The reflective element may be substantially transparent. In one implementation the reflective element may include, a holographic foil backed by a protective casing.

In another aspect the disclosure relates to a holographic display system for a portable electronic device which includes a case and a collapsible holographic projection apparatus. The case is configured to hold the portable electronic device and the collapsible holographic projection apparatus is coupled to the case. The collapsible projector apparatus is disposed to be placed into an extended state and a collapsed state. During operation of the display system, the collapsible holographic projection apparatus is configured to generate holographic images perceptible to a user of the portable electronic device when the collapsible holographic projection apparatus is placed in the extended state. When placed in the collapsed state, the collapsible holographic projection apparatus assumes a generally planar form substantially parallel to a rear surface of the case.

The collapsible holographic projection apparatus may include, a projector coupled to the case by a first hinge element. The projector includes a projector screen for generating images. The collapsible holographic projection apparatus may further include a reflective element coupled to the projector by a second hinge element, the reflective element being oriented to reflect light from the images in order to create the holographic images. A substantially transparent touch screen may be attached to the first hinge element and movable between an extended state in optical alignment with the holographic images and a collapsed state substantially parallel to a surface of the projector screen.

BRIEF DESCRIPTION OF THE DRAWINGS

For a better understanding of the nature and objects of various embodiments of the invention, reference should be made to the following detailed description taken in conjunction with the accompanying drawings, wherein:

FIGS. 12A-12D illustrate an exemplary prototype embodiment of a holographic display system for use with a portable electronic device in accordance with the disclosure.

FIG. 13 is a flowchart illustrating a procedure for deploying a holographic display assembly in accordance with an embodiment.

DETAILED DESCRIPTION

Figure 1:
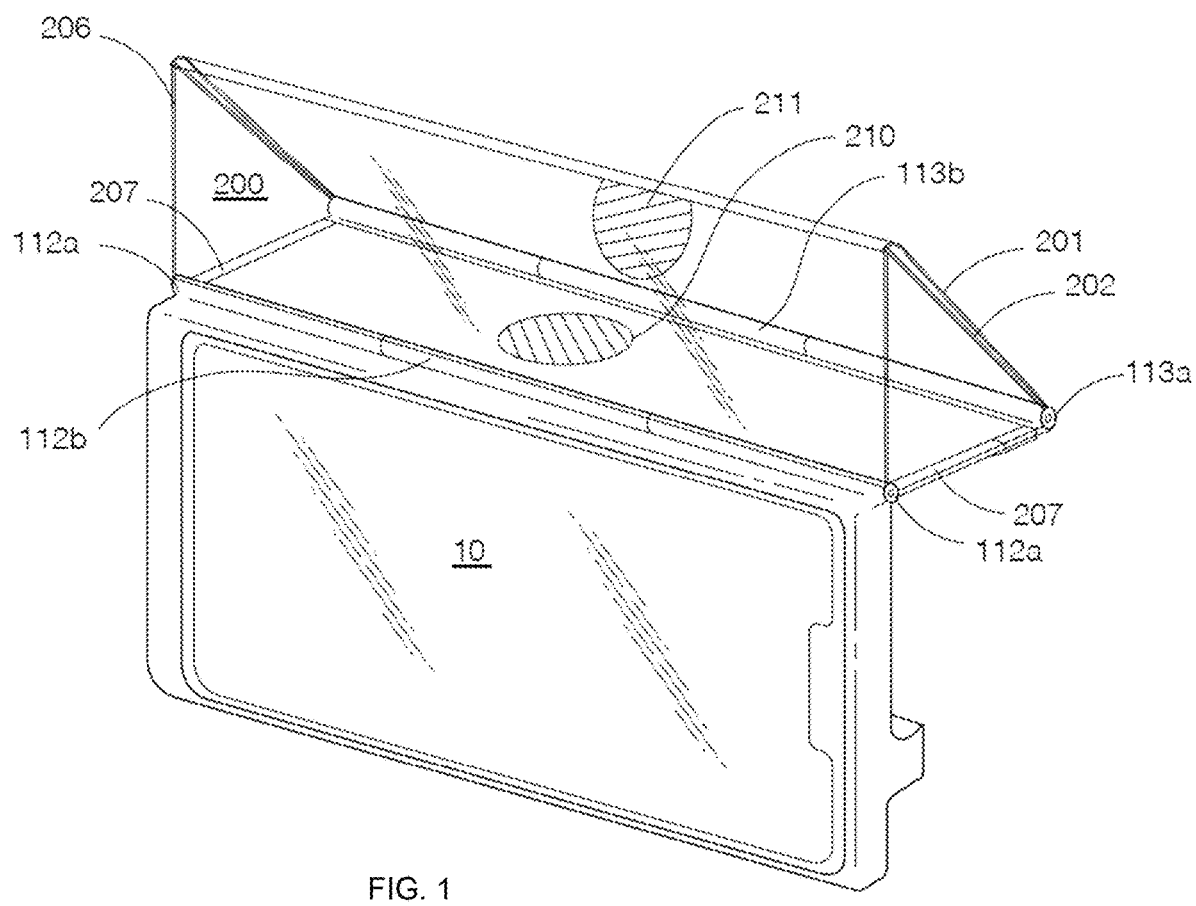
FIG. 1 is a front perspective view of the projector accessory with a phone inserted.

While various embodiments are described herein, it should be understood that they have been presented by way of example only, and not limitation. They are not intended to be exhaustive or to limit the claims to the precise forms disclosed. Indeed, many modifications and variations are possible in view of the teachings herein. The embodiments have been chosen and described in order to best explain the principles of the described systems and methods and their practical applications, they thereby enable others skilled in the art to best utilize the described systems and methods and various embodiments with various modifications as are suited to the particular use contemplated.

Embodiments of the present system are discussed below with reference to FIGS. 1-13. Note that the illustrations in the figures are representative only, and are not drawn to scale, the emphasis having instead been placed upon clearly illustrating the principles of the invention and its disclosed embodiments. Those skilled in the art will understand and appreciate that the detailed description provided herein regarding these figures is for explanatory purposes as the invention extends beyond these limited embodiments.

Embodiments disclosed herein provide a holographic display system including a protective case for a portable electronic device. A collapsible holographic projector assembly attached to the case may include a reflective or partially reflective screen for projecting virtual (e.g., free floating) images from an externally attached display screen or projector. The use of screens with varying degrees of reflection is to increase the degree of light reflected and thus increase the user's perceived brightness or strength of the perceived image. The reflective screen is also housed in a collapsible hinge system for compression and portability to improve the user experience and function. For added benefit, the holographic display system not only includes a case for providing a protective, ornamental, or textured covering for an electronic device, the holographic display capability of the system can also augment and improve the users viewing experience. The disclosed system also includes an internal, rechargeable battery capable of both powering the holographic display function while also serving as an extended battery for the attached electronic devices. The disclosed system is well suited for stationary powered electronic devices (desktop computers), and, more particularly, battery-powered, handheld, portable electronic devices such as laptops or tablet computers (PC, Mac, linux, Chromebook, etc.), portable media players, smart phones, tablet-smartphone hybrids, and portable game players.

FIG. 1-9 illustrate a holographic display system 100 for a portable electronic device 10 (e.g., a smartphone) in accordance with the disclosure. As is discussed herein, the holographic display system 100 includes a case body 111 for holding the electronic device 10 and a holographic display assembly 120. The holographic display assembly 120 includes a collapsible hinge system for positioning an external video projector such as a display screen 203 relative to a reflective or partially reflective screen 200. The case body 111 is designed and configured to fit and securely hold the portable electronic device 10.

Attention is now directed specifically to FIG. 1, which is a front perspective depiction of the holographic display system 100 attached to an electronic device 10. In FIG. 1, the holographic display assembly 120 is in a fully deployed and powered on state. During operation, a video signal is sent to the holographic display system 100 from the external plug-in port of the attached electronic device 10 via a USB, USB-C, Lightning, or other commonly used plug in cable that can both supply a transfer of power and send/receive information signals. In certain embodiments this cabling is adapted based upon the cable/plug interface characteristics of the device 10 to which the display system 100 is to be applied to at time of manufacturing. When collapsed, the holographic hinge system fits evenly into the back of the case device 100 for convenience and user-friendliness. The collapsible hinge system of the holographic display assembly 120 is attached to the case body 111 via an attached, raised hinge base 112a that is structured onto the case material itself and subsequently connects via the display panel 203 to the second, floating hinge 113a with a central division 113b on which the protective panel 201 and reflective screen 202 are attached for rotation.

As shown in FIG. 1, in a fully deployed state the video projector in the form of display screen 203 is suspended at a 90° angle from the attached hinge 112a of the case 111. When visual content 210 is displayed on the display screen 203 in response to the video signal from the electronic device 10, light projected by the display screen 203 is reflected forward from the reflective or partially reflective screen 202 in such a way as to form a virtual image 211 (i.e., a hologram) corresponding to the content 210. A user of the device 10 will perceive the virtual image 211 to be hovering or floating above the electronic device 10. In one embodiment the virtual image 211 comprises a Pepper's Ghost hologram established by orienting the reflective screen 202 at approximately a 45-degree angle relative to the display screen 203. The screen 202 preferably is substantially transparent and thus not visible to a human observer.

Figure 2:
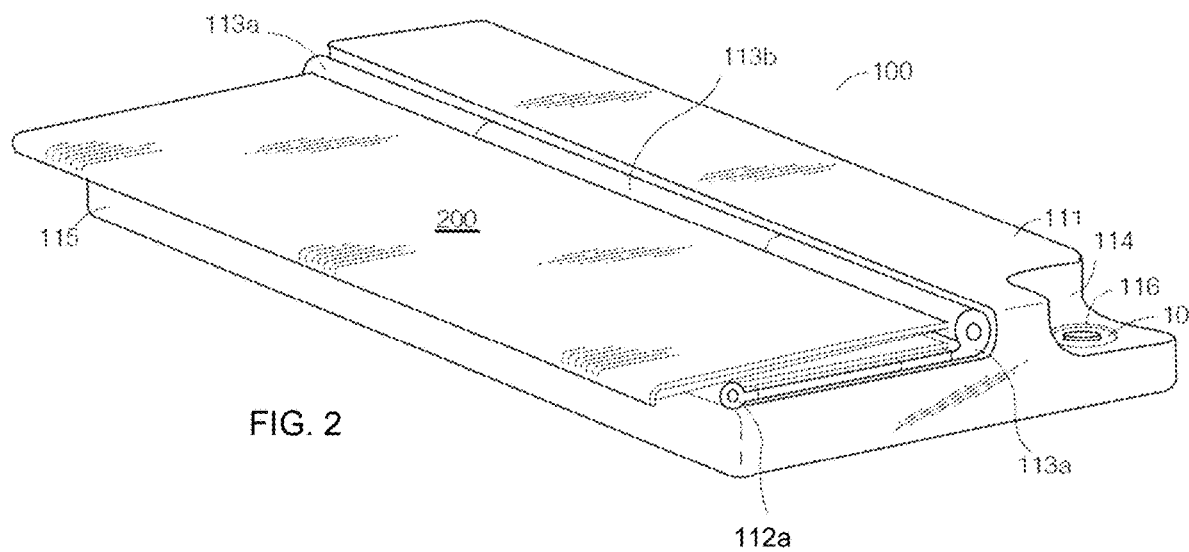
FIG. 2 is a perspective view of an embodiment of the holographic display system in which the holographic display assembly is in a closed position, with a phone or other portable electronic device inserted in a case of the display system.

FIG. 2 is a perspective view of an embodiment of the holographic display system 100 in which the holographic display assembly 120 is in a closed position, with a phone or other portable electronic device 10 inserted in the case body 111 of the display system. So as not to impede the use of any cameras and sensors of the device 10, indentations in an external case housing 114 of the case body 111 are positioned to provide the cameras with enough space for their full viewable function. A cut out space 116 sufficiently large to allow space for any lens or sensor positions of the device 10 is also provided. One skilled in the art will appreciate the case housing 114 may be adapted to include indentations, cutouts and the like to accommodate the cameras and sensors of various types and models of portable electronic devices. The sides 115 of the case 111 may be designed and dimensioned for an even, seamless fit around the electronic device 10 by using a soft silicone or rubber texture to fit over the corner edges of the device 10.

Figure 3:
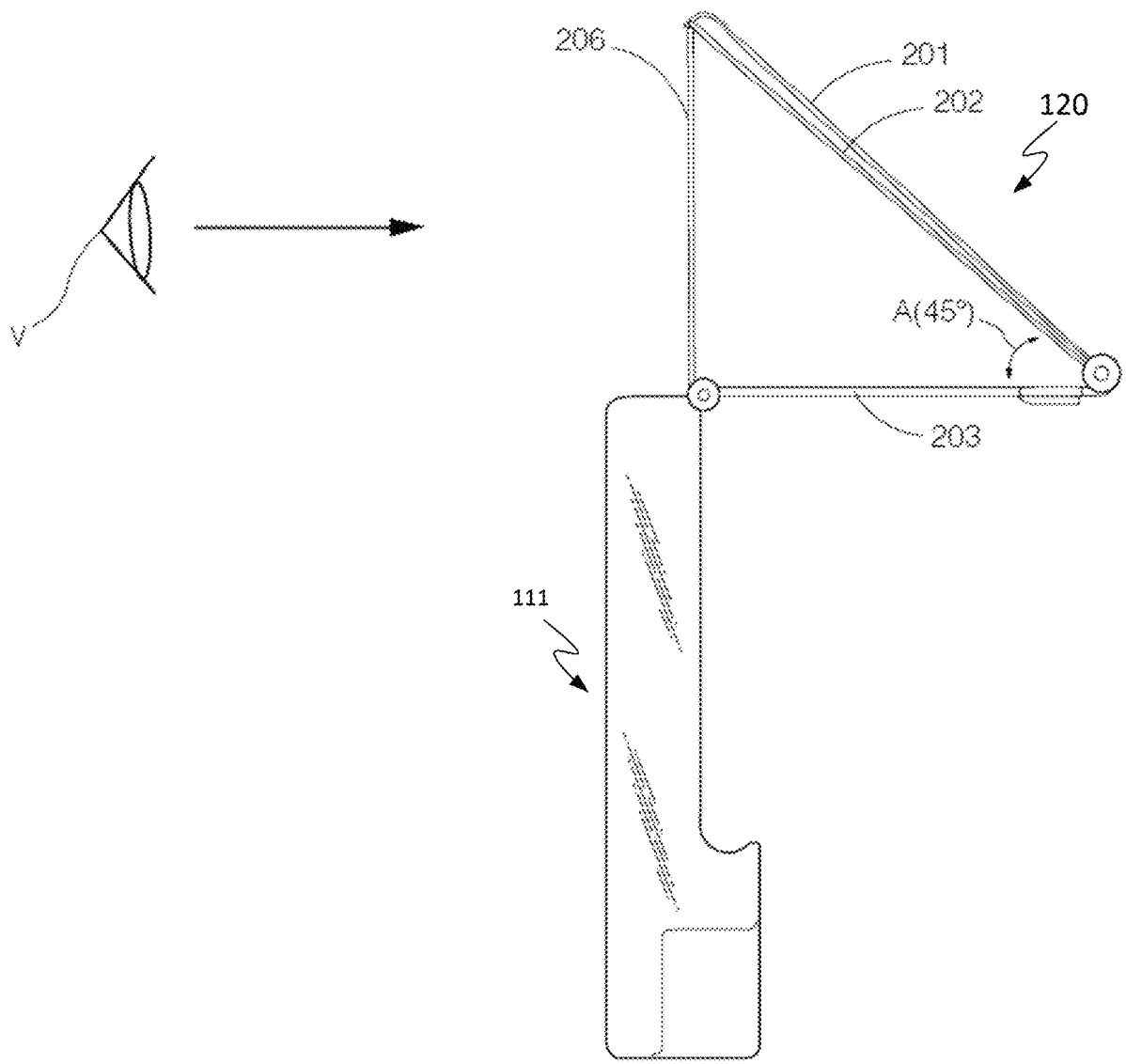
FIG. 3 shows the users view point and angle of projection when the system is active.

FIG. 3 shows the position V of a user of the device 10 relative to the reflective or partially reflective screen 202. With the reflective screen 202 and the protective casing 201 held at a 45° angle, the ideal viewing angle is between 110° to 180° when the holographic display assembly 120 and the electronic device 10 are front facing the viewer. The reflective or partially reflective screen 202 can be glass, mesh, acrylic, fabric, gloss coated, or similar. Multiple layers can also be used (e.g., laminated). In some embodiments mirrored glass or metal sheeting can be used to implement the reflective or partially reflective screen 202. In one embodiment the screen 202 is implemented using a beam splitter comprised of a variety of optically transparent materials such as, for example, plastic, polymer, acrylic resin, or other acrylic materials (such as polyamide acrylics, polymathy methacrylate, polystyrene, polycarbonate, methyl methacrylate styrene, styrene acrylonitrile. acrylonitrile butadiene styrene), or other compounds within the similar sub-groups. In certain embodiments, the screen 202 includes an acrylic polymer such as one sold under the trademark PLEXIGLASS or LEXAN. The refractive index of the reflective polymer is preferably above 1.3. In some embodiments, high refractive index polymer coatings or gloss coatings may be added to increase light refraction or increase the strength of light projected into the field of view. In some embodiments, the optically transparent material can be adapted and or coated with a variety of optical coatings.

Figures 4A, 4B, 4C, 4D:
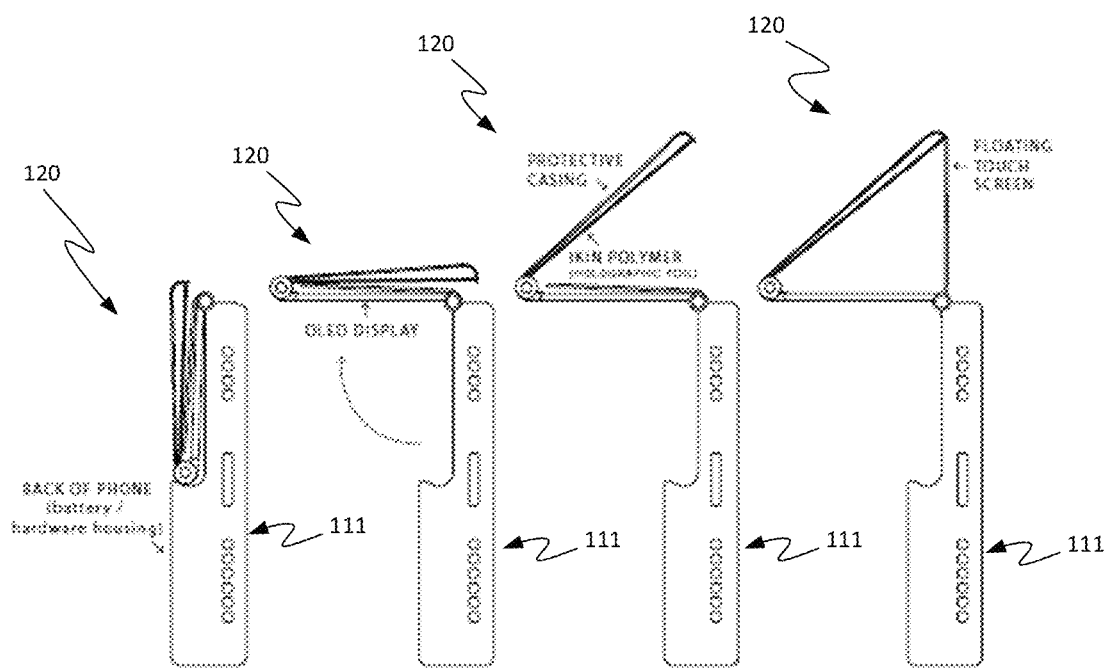
FIGS. 4A-4D illustrate a series of bottom views of an embodiment of the holographic display system in which the holographic display assembly is transitioned from a fully collapsed state to partially and fully deployed states.
Figure 5:
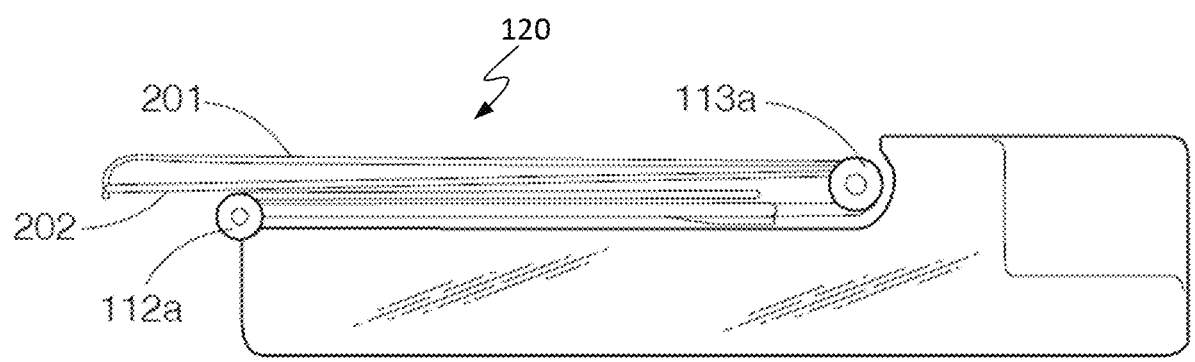
FIG. 5 depicts a top view of the embodiment of the holographic display system shown in perspective view in FIG. 2.

FIGS. 4A-4D illustrate a series of bottom views of the holographic display system 100 in which the holographic display assembly 120 is transitioned from a fully collapsed state to partially and fully deployed states. As shown, FIG. 4A and FIG. 5 depict the holographic display system 100 with the holographic display assembly 120 is in a fully collapsed state.

Figure 6:
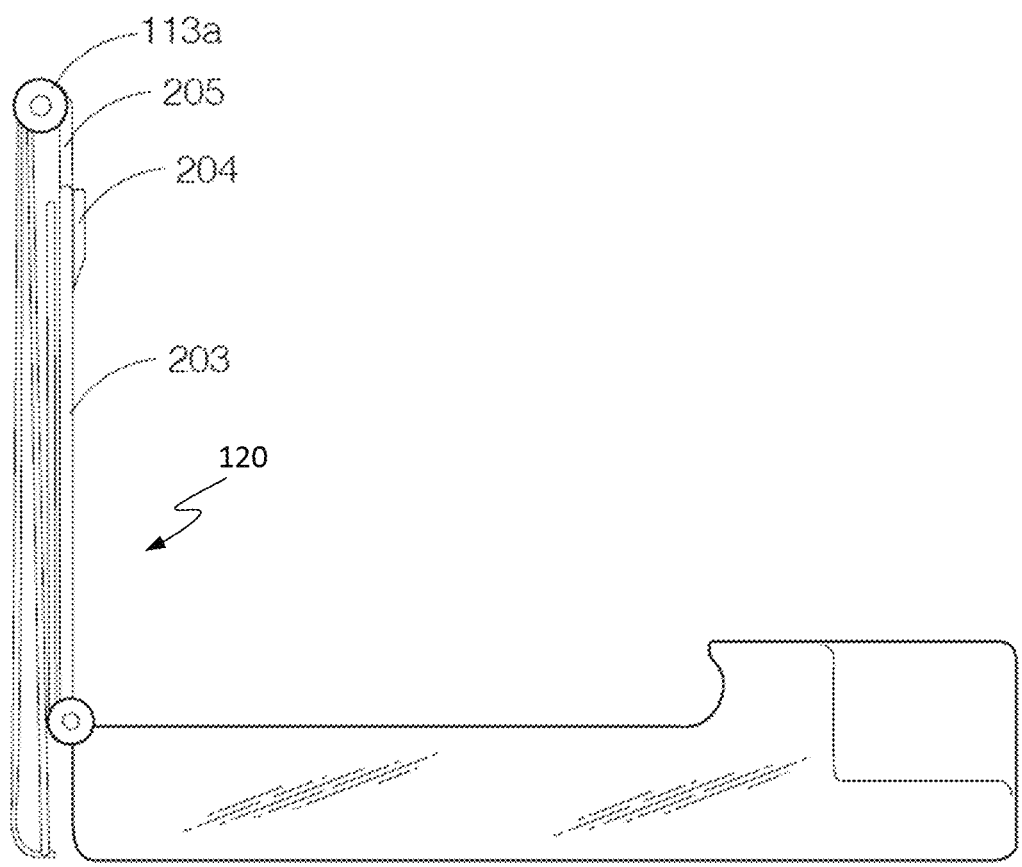
FIG. 6 depicts a top view of the holographic display system of FIG. 2 upon completion of a first motion involved in opening the collapsed holographic display assembly.

Turning now to FIG. 4B and FIG. 6, in order to open the collapsed holographic viewing space the connected base hinge 112a rotates to a 90° angle from the case 111. In so doing the second hinge 113a is set in its floating position, connected by a small extension piece 205 extended from its sliding cover 204 which is fixed to the bottom of the display panel 203.

Figure 7:
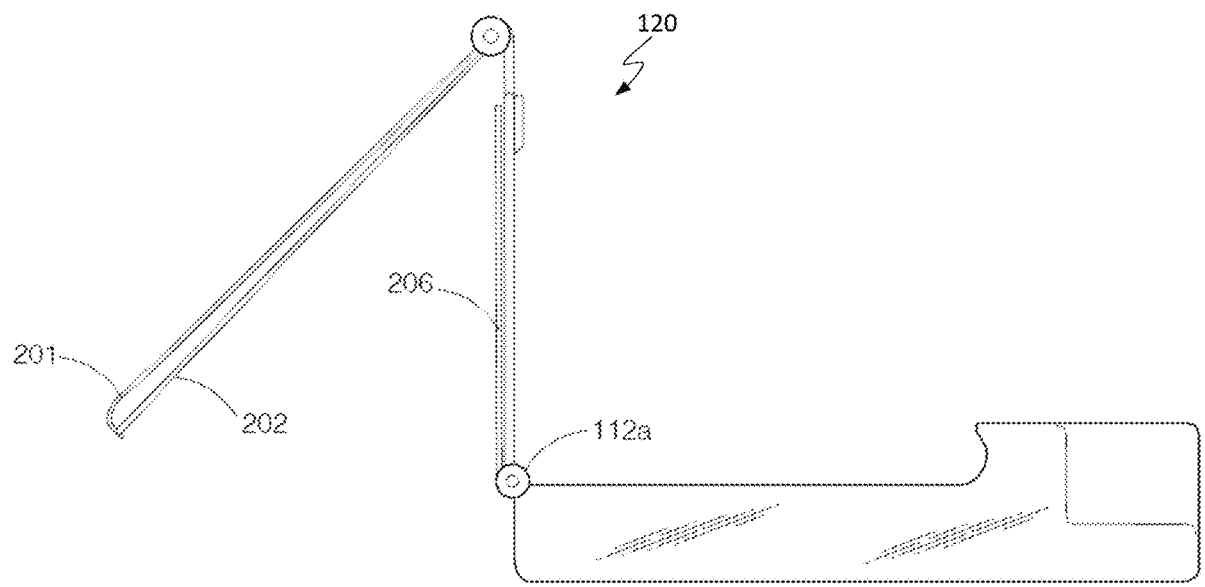
FIG. 7 depicts a top view of the holographic display system of FIG. 2 upon completion of a second motion involved in opening of the collapsed holographic display assembly.

In FIG. 4C and FIG. 7 the floating hinge 113a is subsequently rotated to adjust the protective screen 201 and the reflective screen 202 to set the reflective screen at a 45° angle to the display screen 203. Preferably the floating hinge 113a contains a stop position that allow the reflective screen to be pivoted only between a 0° and 45° angle relative to the display screen 203.

Figure 8:
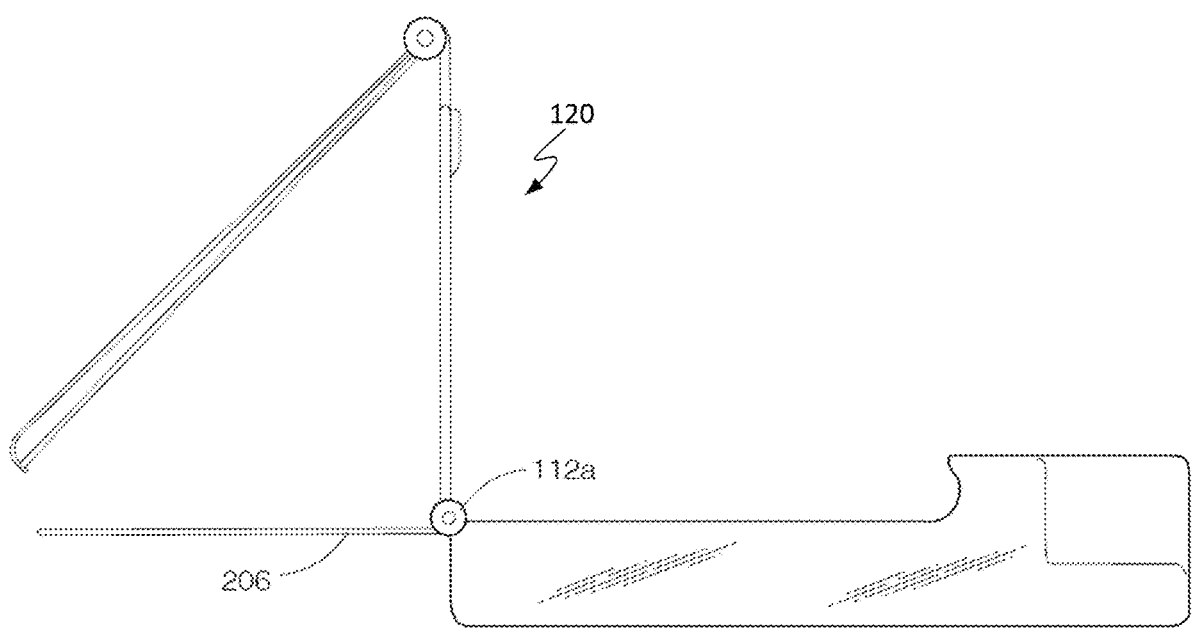
FIG. 8 depicts a top view of the holographic display system of FIG. 2 upon completion of a third motion involved in opening of the collapsed holographic display assembly.

In FIG. 4D and FIG. 8, after the reflective screen 202 is opened to its 45° angled position, a glass or similar touch screen (e.g., a capacitance touch screen) 206 which is attached to a central division 112b of the base hinge 112a, is rotated into its opened position at an angle of 90° relative to the display screen 203. The touch screen 206 is optional and other embodiments may not include a touch screen. In embodiments when no touch screen is used, the holographic reflective screen 202 may reach its optimal viewing angle via a supporting spring loaded hinge, or it may be set manually into its 45° locked position. Alternatively, other embodiments may include "glassless" touch screens, such as a glassless touch field implemented using an infra-red (IR) source.

After the touch screen 206 is rotated to its opened position, the floating hinge 113a and its connected extension piece 205 is compressed inward to fit inside the sliding cover 204 fixed under the bottom of the display screen 203. The sliding motion is secured using braces on the sides of the display screen 207 to secure the position of all angles in place. A curvature 209 at the upper portion of the protective screen 201 with a joining point of the reflective screen 202 with the protective screen 208 creates a clasping point for the touch screen 206 thus locking all necessary angled planes into position. When the display is no longer desired for use, all planes within the holographic system 200 can be compressed in the reverse order as the screens opening motions to return to its collapsed state behind the electronic device 10.

Figure 9:
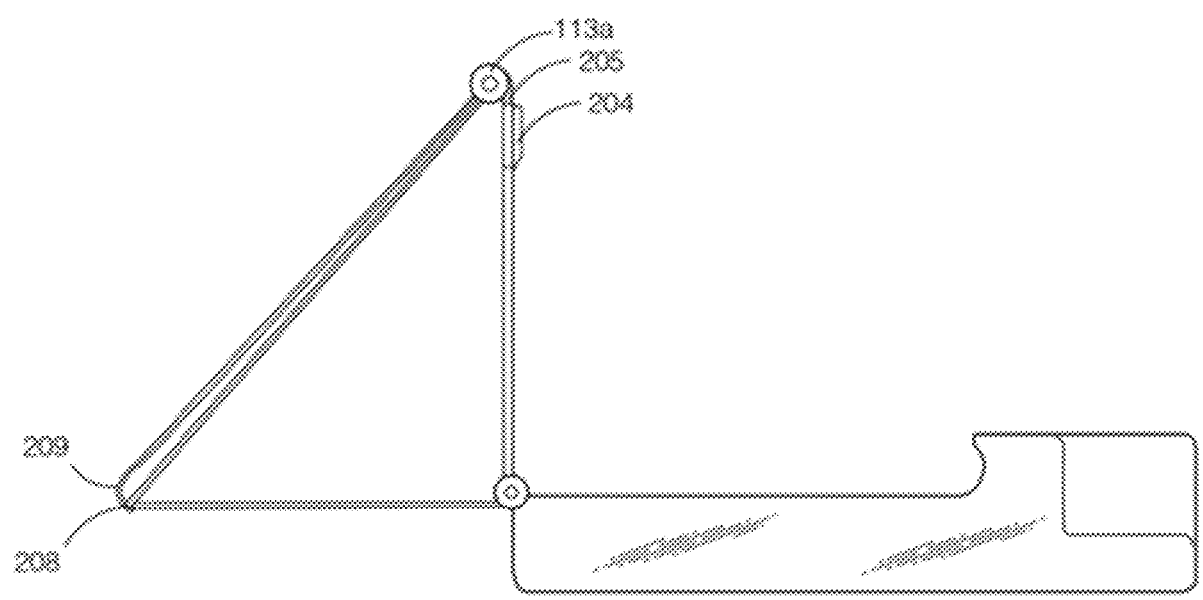
FIG. 9 depicts a top view of the holographic display system of FIG. 2 with the holographic display assembly in a fully opened state.

FIG. 9 depicts a top view of the holographic display system of FIG. 2 with the holographic display assembly in a fully opened state. In certain embodiments, a black screen or darkened background is placed behind the hologram apparatus to increase the visibility of the optical reflection, thus improving the hologram. In such embodiments a darkened background panel (not shown) may be attached to the floating hinge 113a and positioned behind the reflective screen 202. That is, such a background panel could be rotated by hinge 113a to, for example, an angle of approximately 90° relative to the display screen 203 (approximately 45° relative to the reflective screen 202 when deployed).

Figure 10:
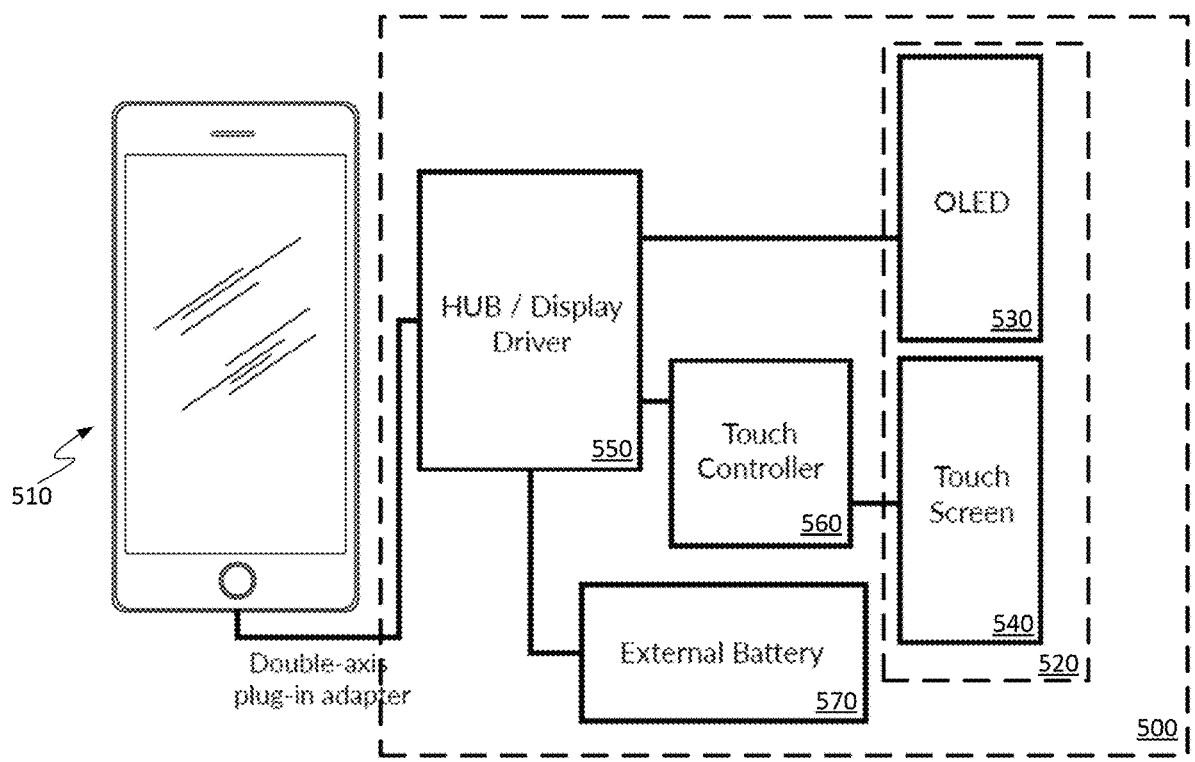
FIG. 10 is a block diagram illustrating an exemplary set of components included within an embodiment of a holographic display system for a portable electronic device in accordance with the disclosure.

FIG. 10 is a block diagram illustrating an exemplary set of components included within an embodiment of a holographic display system 500 for a portable electronic device 510 in accordance with the disclosure. As shown, the holographic display system 500 includes a holographic display assembly 520 including an organic light emitting diode (OLED) display 530 and a touch screen 540. In the embodiment of FIG. 10 the reflective surface and collapsible hinge arrangement of the holographic display assembly 520 are not electronic components and are thus not shown. A hub and display driver element 550 conventionally drives the OLED display 530 in accordance with an image or video signal provided by the portable electronic device 510. In alternate embodiments the holographic display system 500 may include a memory (not shown) for caching image or video data provided to the OLDED display 530. The hub and display driver element 550 also receives touch-related data from a touch controller 560 operably connected to the touch screen 540. In some embodiments the hub and display driver element 550 may provide this touch-related data to the portable electronic device 510 which may be configured to, for example, adjust or modify the image or video signal which it provides to the hub and display driver element 550. In other embodiments the hub and display driver element 550 may be configured to otherwise alter the image produced by the OLED display 540 in response to the touch-related information by, for example, providing an overlay image of video signal to the OLED display 530. In one embodiment the holographic display system 500 further includes an external battery 570 for providing power to its electronic components.

Figures 11A, 11B, 11C:
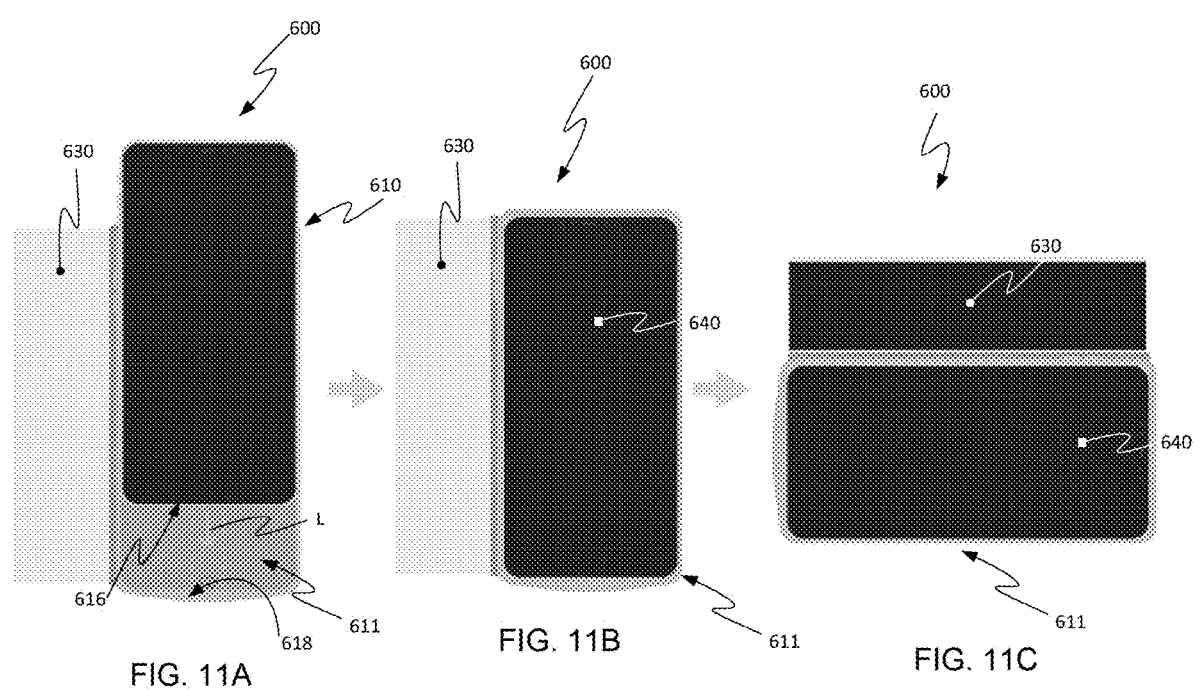
FIGS. 11A-11C illustrate exemplary deployment and use of an embodiment of a holographic display system of the present disclosure in conjunction with a portable electronic device.

FIGS. 11A-C illustrate exemplary deployment and use of an embodiment of a holographic display system 600 of the present disclosure in conjunction with a portable electronic device 610. As shown, the portable electronic device 610 may be inserted into a flexible case 611 of the display system 600 by sliding a bottom end 616 of the portable electronic device along a longitudinal direction L until it is seated in a lower lip 618 of the case 611. In one embodiment holographic images produced by the display system 600 may occupy a holographic viewing area 630 having two-dimensional cross section of an area comparable to an area of a display screen 640 of the portable electronic device 610. In FIGS. 11A and 11B, an outline of a holographic viewing area 630 is depicted to show the useable hologram screen space relative display screen 640.

FIG. 11C illustrates that the viewing area 630 may be utilized together with the display screen 640 to present images and/or selectable user interface elements (e.g., app icons). For example, images rendered by the display screen 640 may be extended into the viewing area 630 (so that such images are rendered cooperatively through the display screen 640 and viewing area 630). Alternatively, the display screen 640 may display certain images while other holographic images may be separately and independently rendered through the viewing area 630.

FIGS. 12A-12D illustrate an exemplary prototype embodiment of a holographic display system 700 for use with a portable electronic device 710 in accordance with the disclosure. The display system includes a case 714 collapsible holographic display assembly 720 having a display screen 730, a reflector 734 and a substantially transparent touch screen 738. The case 714 securely retains the portable electronic device 710 and is coupled to the collapsible holographic display assembly 720 by one or more hinges of the type described herein. FIG. 12A provides a front view of the holographic display system 700 and portable electronic device 710 with the holographic display assembly 720 configured in an open, i.e., non-collapsed, state. FIG. 12B is a front view of the holographic display system 700 and portable electronic device 710 with the holographic display assembly 720 configured in a collapsed, closed state. FIG. 12C illustrates an isometric view of the holographic display system 700 and portable electronic device 710 with the holographic display assembly 720 configured in an open, i.e., non-collapsed, state. FIG. 12D illustrates an isometric view of the holographic display system 700 and portable electronic device 710 with the holographic display assembly 720 configured in a collapsed, closed state.

Attention is directed to FIG. 13, which is a flowchart illustrating a procedure for deploying a holographic display assembly in accordance with an embodiment. The procedure includes providing a holographic display system including a holographic display assembly having a projector screen coupled to a case by a first hinge element, a reflective element coupled to the projector by a second hinge element, and a transparent touch screen hinged to the case (stage 1302). The first hinge element is rotated to position the projector screen at a first predefined angle relative to a surface of the case (stage 1304). The procedure includes rotating the second hinge element to set the reflective element at a second predefined angle relative to the projector screen (stage 1308). A transparent touch screen hinged to the case is rotated to a third predefined angle relative to the projector screen (stage 1312). The procedure further includes sliding a floating hinge and an extension piece of the second hinge element into a sliding cover disposed under a bottom of the projector screen (stage 1316).

Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded into one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A holographic display assembly for a portable electronic device, the display assembly comprising:
   a projector including a projector screen for generating images;
   a reflective element;
   a touch screen and
   a collapsible hinge system configured to facilitate opening of the holographic display assembly from a collapsed state to an opened state, the collapsible hinge system including a base hinge coupled to the projector wherein the projector screen is substantially perpendicular to the touch screen when the bolographic display assembly is in the opened state and wherein the touch screen is substantially parallel to the projector screen when the holographic display assembly is in the collapsed state;
   wherein the reflective element is oriented to reflect light from the images in order to create holographic images perceptible to a user of the portable electronic device when the holographic display assembly is in the opened state.

2. The holographic display assembly of claim 1 wherein the projector screen is movable between an extended state substantially perpendicular to a display screen of the portable electronic device and a collapsed state substantially parallel to a rear surface of the portable electronic device.

3. The holographic display assembly of claim 1 wherein the reflective clement is movable between an extended state at an acute angle to the projector screen and a collapsed state substantially parallel to the projector screen.

4. The holographic display assembly of claim 1 wherein the reflective element includes a holographic foil backed by a protective casing.

5. The holographic display assembly of claim 1 wherein the reflective element is substantially transparent.

6. The holographic display assembly of claim 1 wherein the projector screen is one of a liquid crystal display screen and an organic light emitting diode display screen.

7. A holographic display assembly for a portable electronic device, the display assembly comprising:
   a base hinge;
   a collapsible holographic projection apparatus coupled to the base hinge, the collapsible projection apparatus being disposed to be placed into an extended state and a collapsed state, wherein the collapsible holographic projection apparatus includes:
      a projector coupled to the base hinge, the projector including a projector screen for generating images;
      a reflective element oriented to reflect light from the images in order to create the holographic images;
   wherein the collapsible holographic projection apparatus is configured to generate holographic images perceptible to a user of the portable electronic device when placed in the extended state and to assume a generally planar form when placed in the collapsed state; and
   a substantially transparent touch screen in optical alignment with the holographic images.

8. A holographic display assembly for a portable electronic device, the display assembly comprising:
   a base hinge; and
   a collapsible holographic projection apparatus coupled to the base hinge, the collapsible projection apparatus being disposed to be placed into an extended state and a collapsed state wherein the collapsible holographic projection apparatus includes:
a projector coupled to the base hinge, the projector including a projector screen for generating images;
a reflective element oriented to reflect light from the images in order to create the holographic images, wherein the reflective element is movable between an extended state at an acute angle to the projector screen and a collapsed state substantially parallel to the projector screen;
wherein the collapsible holographic projection apparatus is configured to generate holographic images perceptible to a user of the portable electronic device when placed in the extended state and to assume a generally planar form when placed in the collapsed state.

* * * * *